(12) United States Patent
Yang et al.

(10) Patent No.: US 9,310,846 B2
(45) Date of Patent: Apr. 12, 2016

(54) TOUCH CONTROL DISPLAY DEVICE

(71) Applicants: Inventec (Pudong) Technology Corporation, Shanghai (CN); INVENTEC CORPORATION, Taipei (TW)

(72) Inventors: Tsun-Hsiang Yang, Taipei (TW); Cheng-Hsuan Hsieh, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 149 days.

(21) Appl. No.: 14/230,001

(22) Filed: Mar. 31, 2014

(65) Prior Publication Data

US 2015/0153781 A1 Jun. 4, 2015

(30) Foreign Application Priority Data

Nov. 29, 2013 (CN) .......................... 2013 1 0629943

(51) Int. Cl.
| | |
|---|---|
| *H05K 5/00* | (2006.01) |
| *G06F 1/16* | (2006.01) |
| *B32B 5/18* | (2006.01) |
| *B32B 7/12* | (2006.01) |
| *B32B 27/06* | (2006.01) |
| *B32B 27/30* | (2006.01) |
| *B32B 27/36* | (2006.01) |

(52) U.S. Cl.
CPC ................ *G06F 1/1656* (2013.01); *B32B 5/18* (2013.01); *B32B 7/12* (2013.01); *B32B 27/065* (2013.01); *B32B 27/308* (2013.01); *B32B 27/36* (2013.01); *B32B 27/365* (2013.01); *G06F 1/1643* (2013.01); *B32B 2266/0278* (2013.01); *B32B 2457/20* (2013.01)

(58) Field of Classification Search
CPC ....... G06F 3/044; G06F 3/041; G06F 1/1616; G06F 1/1601; G02F 1/13338; G02F 1/133308; G02F 2202/28; G02F 1/133608; B32B 2457/208

See application file for complete search history.

(56) References Cited

U.S. PATENT DOCUMENTS 3,573,146 A * 3/1971 Joseph ........................ C09J 7/04
428/343
9,062,855 B2 * 6/2015 Jeong ...................... F21V 15/00

(Continued)

FOREIGN PATENT DOCUMENTS

| TW | 201216809 A1 | 4/2012 |
|---|---|---|
| TW | I384300 | 2/2013 |

*Primary Examiner* — Robert J Hoffberg
*Assistant Examiner* — Hung Dang
(74) *Attorney, Agent, or Firm* — CKC & Partners Co., Ltd.

(57) ABSTRACT

A touch control display device includes a back cover, a front cover, a touch panel, a display panel, and a composite adhesive layer. The back cover has a frame and an accommodating space. The front cover has an opening. The front cover is aligned with and attached to the frame of the back cover. The touch panel is fixed on an outer edge of the front cover and is aligned with the opening of the front cover. The display panel is disposed in the accommodating space of the back cover and aligned with the opening. The composite adhesive layer surrounds the inner edge of the front cover and is aligned with an edge portion of the display panel. The composite adhesive layer is attached on the edge portion of the display panel to fix the front cover on the display panel tightly.

9 Claims, 5 Drawing Sheets

(56) References Cited

U.S. PATENT DOCUMENTS

| | | | |
|---|---|---|---|
| 2006/0261737 A1* | 11/2006 | Bae | H05K 7/20963 313/582 |
| 2009/0098376 A1* | 4/2009 | Fukuoka | B24B 37/20 428/337 |
| 2011/0102342 A1* | 5/2011 | Iwawaki | G06F 1/1626 345/173 |

* cited by examiner

TOUCH CONTROL DISPLAY DEVICE

RELATED APPLICATIONS

This application claims priority to Chinese Application Serial Number 201310629943.6, filed Nov. 29, 2013, which is herein incorporated by reference.

BACKGROUND

1. Field of Invention

The present invention relates to a display device. More particularly, the present invention relates to a touch control display device.

2. Description of Related Art

During manufacture of a conventional display device, it is hard to avoid a back cover from being contaminated by dust or moisture. When a display panel is fixed on the back cover, the dust or moisture from the back cover is easily transferred to the display panel. If the display panel is contaminated with dust or moisture, this may cause light interference to thereby negatively affect the quality of the display. Moreover, if dust or moisture enters the circuitry inside the display panel, this may cause malfunctioning of the display device.

After manufacture of the conventional display device, in the case where the display device functions as a touch panel for a tablet computer, a user operates the tablet computer through touching the touch panel using his or her fingers. However, after the user has used the touch panel for a long time by making various touch gestures thereon, delamination of fixed areas of the touch panel may occur. Therefore, there is a need to improve the problem of vibrations caused by the application of finger touches.

SUMMARY

According to one embodiment of the present invention, a touch control display device includes a back cover, a front cover, a touch panel, a display panel, and a composite adhesive layer. The back cover has a frame and an accommodating space. The front cover has an opening. The front cover is aligned with and attached to the frame of the back cover. The touch panel is fixed on an outer edge of the front cover and is aligned with the opening of the front cover. The display panel is disposed in the accommodating space of the back cover and is aligned with the opening. The composite adhesive layer surrounds the inner edge of the front cover and is aligned with an edge portion of the display panel to fix the front cover on the display panel hermetically. The composite adhesive layer includes a first adhesive layer, a buffer layer, and a second adhesive layer. The first adhesive layer is adhered to the front cover, and the buffer layer is disposed between the first adhesive layer and the second adhesive layer. The buffer layer made of an elastic buffering material. The second adhesive layer is adhered to the display panel, and an adhesive property of the first adhesive layer is stickier than an adhesive property of the second adhesive layer.

According to one embodiment of the present invention, the first adhesive layer is a polyethylene terephthalate (PET) double-sided adhesive layer including two polymethylmethacrylate (PMMA) layers and a PET layer. The PET layer is disposed between the PMMA layers, and one of the PMMA layers is adhered to the front cover and the other one of the PMMA layers is adhered to the buffer layer.

According to one embodiment of the present invention, the buffer layer is a foamy layer made of a polyurethane material.

According to one embodiment of the present invention, the second adhesive layer is a PET double-sided adhesive layer including a glue layer, a PET layer, and an acrylic acid layer. The PET layer is disposed between the glue layer and the acrylic acid layer, the glue layer is adhered to the display panel, and the acrylic acid layer is adhered to the buffer layer.

According to one embodiment of the present invention, the composite adhesive layer further includes a fourth adhesive layer and a fifth adhesive layer. The fourth adhesive layer is disposed adhesively between the first adhesive layer and the fifth adhesive layer, and the fifth adhesive layer is disposed adhesively between the fourth adhesive layer and the buffer layer.

According to one embodiment of the present invention, the first adhesive layer is a PET double-sided adhesive layer including two PMMA layers and a PET layer. The PET layer is disposed between the PMMA layers. One of the PMMA layers is adhered to the front cover and the other one of the PMMA layers is adhered to the fourth adhesive layer According to one embodiment of the present invention, the fourth adhesive layer is a polycarbonate (PC) layer.

According to one embodiment of the present invention, the fifth adhesive layer is a tissue-base double-sided adhesive layer including a cotton paper layer and two acrylic acid layers. The cotton paper layer is disposed between the acrylic acid layers. One of the acrylic acid layers is adhered to the fourth adhesive layer and the other one of the acrylic acid layers is adhered to the buffer layer.

According to one embodiment of the present invention, the buffer layer a foamy layer made of a polyurethane material.

According to one embodiment of the present invention, the second adhesive layer is a PET double-sided adhesive layer including a glue layer, a PET layer, and an acrylic acid layer. The PET layer is disposed between the glue layer and the acrylic acid layer, the glue layer is adhered to the display panel, and the acrylic acid layer is adhered to the buffer layer.

During assembly of the touch control display device of the present invention, an assembly worker aligns the front cover with the frame of the back cover, and then adheres the front cover to the back cover. However, when the assembly worker performs the adhering operation improperly, the particular design of the composite adhesive layer in the present invention is such that the assembly worker is able to redo the adhering operation. After the assembly worker removes the front cover from the back cover, the front cover can be aligned with and adhered to the frame of the back cover again without any adhesive residue being left on the display panel. When the front cover is fixed on the display panel hermetically, because the composite adhesive layer surrounding the inner edge of the front cover can block the entrance of dust or moisture, dust or moisture in the accommodating space formed by the back cover can not reach an illumination side of the display panel. Therefore, the display panel maintains a high display quality and avoids malfunctioning. Moreover, when a user touches the display panel with his or her fingers, a touch force is applied to the display panel. The composite adhesive layer in the present invention can buffer the touch force caused by the user, so it can protect the touch control display device and prevent local delamination caused by touch forces to thereby prolong the life span of the touch control display device. The composite adhesive layer in the present invention is made of a PET material having a great tensile property. For this reason, even if the assembly worker applies a tension to the composite adhesive layer during assembly, the composite adhesive layer will not be deformed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

In order to solve the problem of the conventional display panel being easily contaminated with dust or moisture during manufacture, the present invention provides a touch control display device with a composite adhesive layer to overcome this problem effectively.

Figure 1:
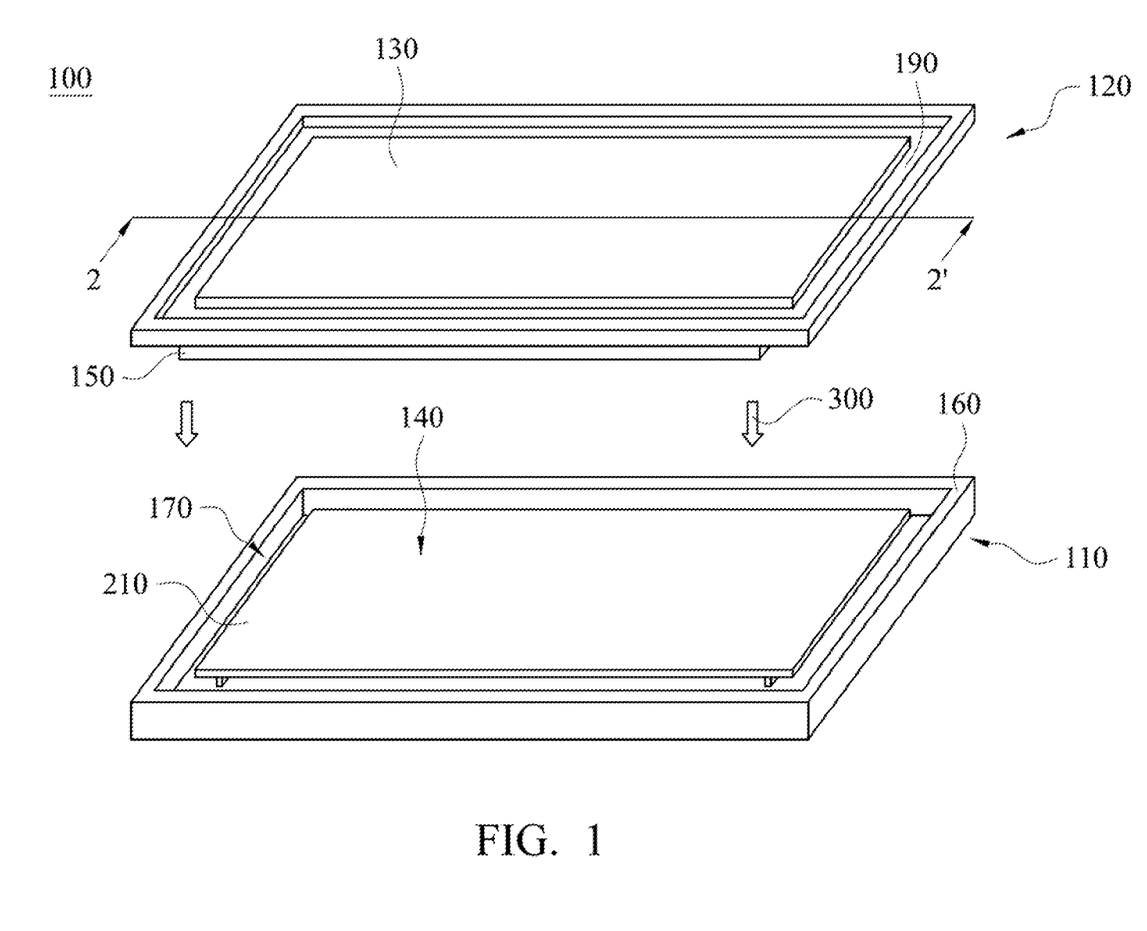
FIG. 1 an exploded perspective view of a touch control display device according to an embodiment of the present invention.
Figure 2:
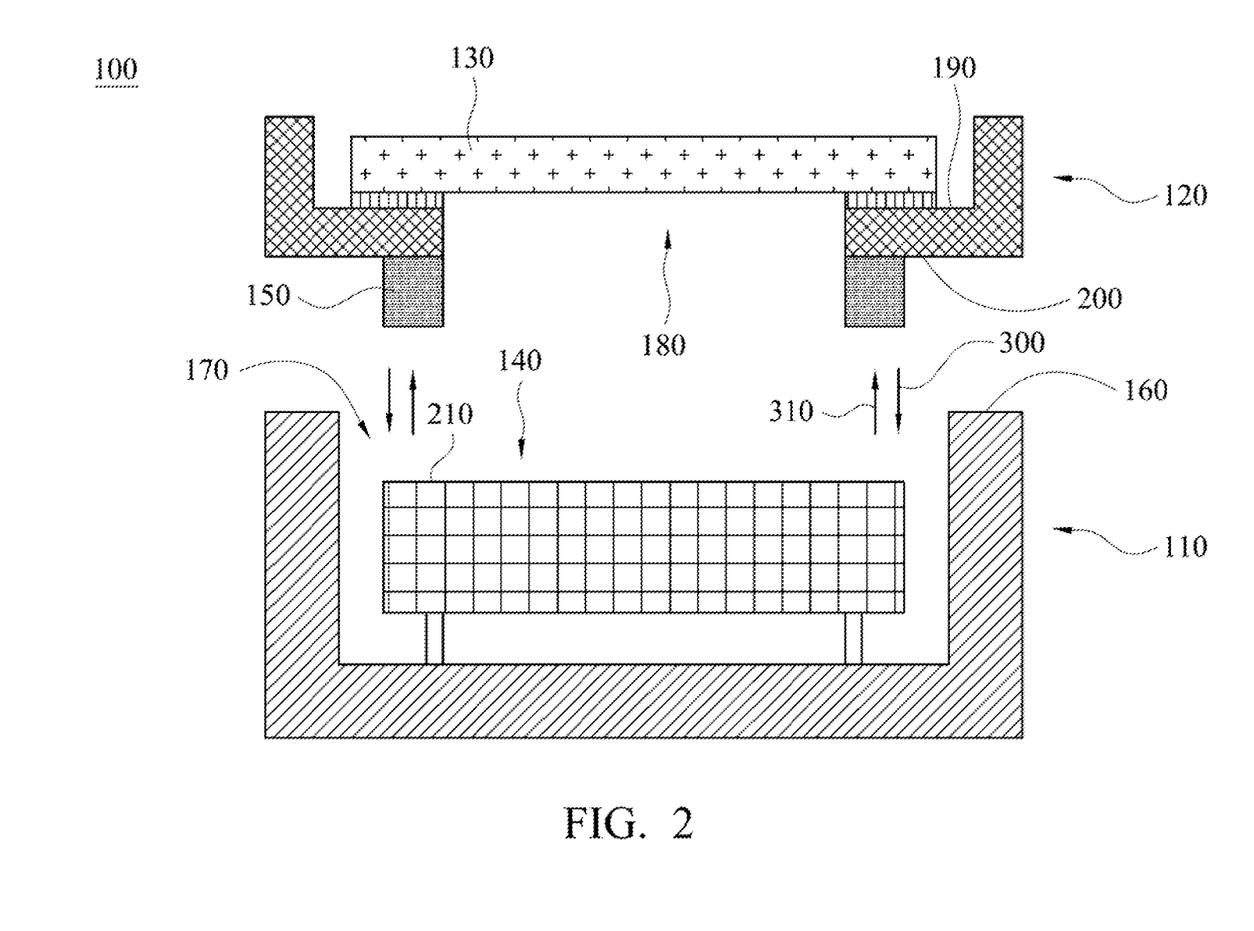
FIG. 2 is a cross-sectional view of the touch control display device in FIG. 1 taken along line 2-2'.

FIG. 1 is an exploded perspective view of a touch control display device according to an embodiment of the present invention, and FIG. 2 is a cross-sectional schematic diagram of the touch control display device in FIG. 1 taken along line 2-2'. A touch control display device 100 of the present invention includes a back cover 110, a front cover 120, a touch panel 130, a display panel 140, and a composite adhesive layer 150. The back cover 110 includes a frame 160 and an accommodating space 170. The front cover 120 includes an opening 180. When an assembly worker performs assembly, the front cover 120 is aligned with the frame 160 of the back cover 110, and then the front cover 120 is attached to the frame 160 of the back cover 110. The touch panel 130 is fixed on an outer edge 190 of the front cover 120 and aligned with the opening 180 of the front cover 120. The display panel 140 is disposed in the accommodating space 170 of the back cover 110 and aligned with the opening 180. The composite adhesive layer 150 is disposed on an inner edge 200 of the front cover 120 and is aligned with an edge portion 210 of the display panel 140.

During assembly, an assembly worker aligns the front cover 120 with the display panel 140 then adheres the front cover 120 to the display panel 140, such that the composite adhesive layer 150 is fixed to the edge portion 210 of the display panel 140. In addition, in the assembly of the touch control display device 100, the assembly worker also aligns the front cover 120 with the frame 160 of the back cover 110, and then adheres the front cover 120 to the back cover 110 by moving the front cover 120 along a direction 300. However, when the assembly worker performs the adhering operation improperly, the particular design of the composite adhesive layer 150 in the present invention is such that the assembly worker is able to redo the adhering operation. That is, the assembly worker can remove the front cover 120 along a direction 310, again align the front cover 120 with the frame 160 of the back cover 110, and finally adhere the front cover 120 to the back cover 110 without any adhesive residue being left on the display panel 140.

Figure 3:
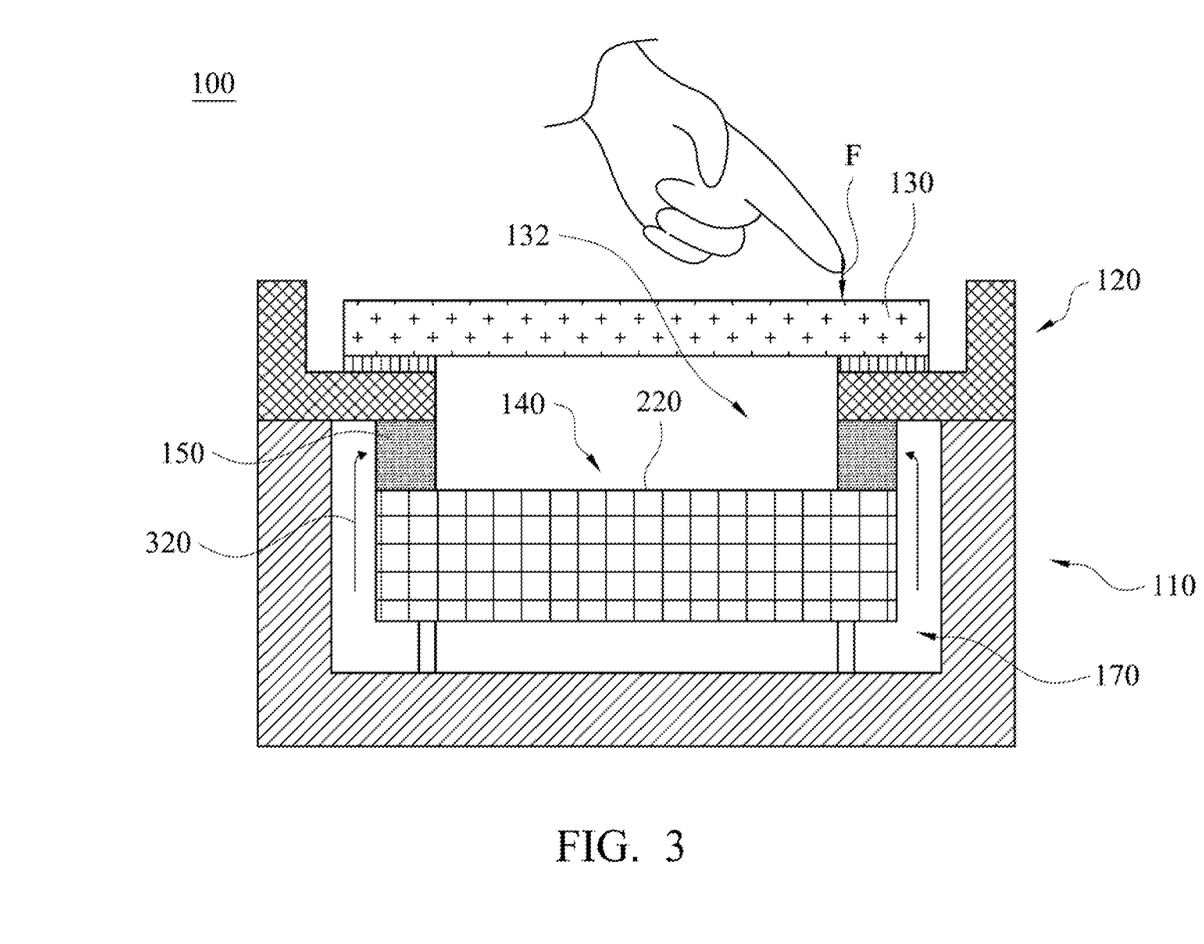
FIG. 3 is a cross-sectional view of the touch control display device in FIG. 2 after assembly.

FIG. 3 is a cross-sectional schematic diagram of the touch control display device in FIG. 2 after assembly. During manufacture of the display device, it is hard to avoid the back cover from being contaminated by dust or moisture. When the display panel is fixed on the back cover, the dust or moisture from the back cover is easily transferred to the display panel. However, after the front cover 120 is fixed on the display panel 140 hermetically, because the surrounding configuration of the composite adhesive layer 150 can block the entrance of dust or moisture, dust or moisture in the accommodating space 170, which is defined by the back cover 110, is unable to enter into an enclosed space 132 between the display panel 140 and the touch panel 130 along a direction 320. Therefore, an illumination side 220 of the display panel 140 can keep clean, and as a result, the display panel 140 maintains a high display quality and malfunctioning of the same is avoided. When a user touches the display panel 130 using his or her finger, a touch force F is applied to the display panel 130. The composite adhesive layer 150 of the touch control display device 100 in the present invention can buffer the touch force F caused by the user, so it can protect the touch control display device 100 and prevent delamination caused by the touch force F to thereby prolong the life span of the touch control display device 100.

Figure 4:
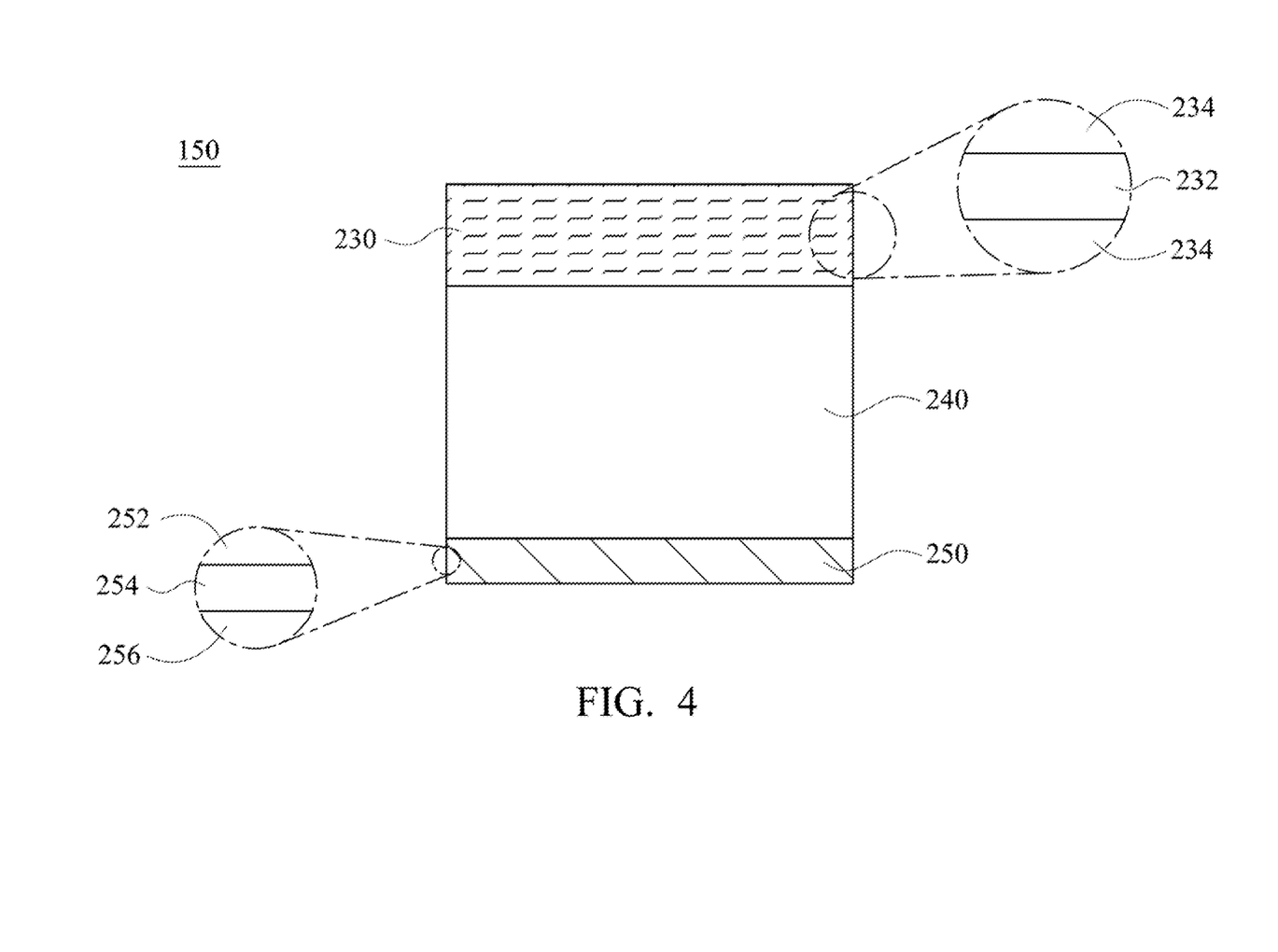
FIG. 4 is a schematic diagram of a composite adhesive layer according to an embodiment of the present invention.

FIG. 4 is a schematic diagram of a composite adhesive layer according to an embodiment of the present invention. As shown in FIG. 3 and FIG. 4, the composite adhesive layer 150 includes a first adhesive layer 230, a buffer layer 240 and a second adhesive layer 250. The first adhesive layer 230 is adhered to the front cover 120. The buffer layer 240 is disposed between the first adhesive layer 230 and the second adhesive layer 250. The buffer layer 240 is made of an elastic buffering material. The second adhesive layer 250 is adhered to the display panel 140. The first adhesive layer 230 is stickier than the second adhesive 250 layer. In other words, the first adhesive layer 230 has a strong adhesive property, while the second adhesive layer 250 has a weak adhesive property. When the assembly worker needs to re-adhere the front cover 120 due to improper positioning of the same, the assembly worker can grasp the front cover 120 and pull on the same, such that the composite adhesive layer 150 is separated from the display panel 140. Because the adhesive property of the second adhesive layer 250 is weak, the second adhesive layer 250 does not leave any adhesive residue on the display panel 140, and the front cover 120 can be easily removed. On the other hand, the adhesive property of the first adhesive layer 230 is strong, such that the first adhesive layer 230 remains adhered stably with the front cover 120 during such a re-assembly operation and the problem of delamination does not occur. With the strong adhesive property of the first adhesive layer 230 and the weak adhesive property of the second adhesive layer 250, when the assembly worker performs such re-assembly, the front cover 120 and the composite adhesive layer 150 remain adhered to each other layer stably, while the removal of the composite adhesive layer 150 from the display panel 140 does not leave any adhesive residue on the same, such that the assembly speed of the touch control display device 100 is improved effectively.

In some embodiments of the present invention, the first adhesive layer 230 is a polyethylene terephthalate (PET) double-sided adhesive layer including two polymethylmethacrylate (PMMA) layers 234 and a PET layer 232. The PET layer 232 is disposed between the PMMA layers 234, and one of the PMMA layers 234 is adhered to the front cover 120 and other one of the PMMA layers 234 is adhered to the buffer layer 240. The first adhesive layer 230 is suitable for adhering and fixing with metal, plastic material, glass, paper material and cotton paper due to its good adhesivity and thermal stability such that the first adhesive layer 230 is also suitable for fixing of screen frames of liquid crystal displays (LCDs), notebook computers, mobile phones, and personal digital assistants (PDAs). In some embodiments of the present invention, the buffer layer 240 is a foamy layer made of a polyurethane material. The foamy layer of the buffer layer 240 is made of an elastic material that can buffer the touch force F. Therefore, the touch control display device 100 is protected from delamination caused by the touch force F to thereby prolong the life span of the touch control display device 100. In some embodiments of the present invention, the second adhesive layer 250 is a PET double-sided adhesive layer including a glue layer 256, a PET layer 254, and an acrylic acid layer 252. The PET layer 254 is disposed between the glue layer 256 and the acrylic acid layer 252. The glue layer 256 is adhered to the display panel 140. The acrylic acid layer 252 is adhered to the buffer layer 240. The second adhesive layer 250 has the characteristics of a weak adhesive property, ability to maintain its adhesivity for a long time, and leaving no adhesive residue after removal. By adhering the second adhesive layer 250 on the display panel 140, the formation of a gap between the glue layer 256 and the display panel 140 can be avoided so that the effects of dustproofing and fog-proofing can be achieved.

Figure 5:
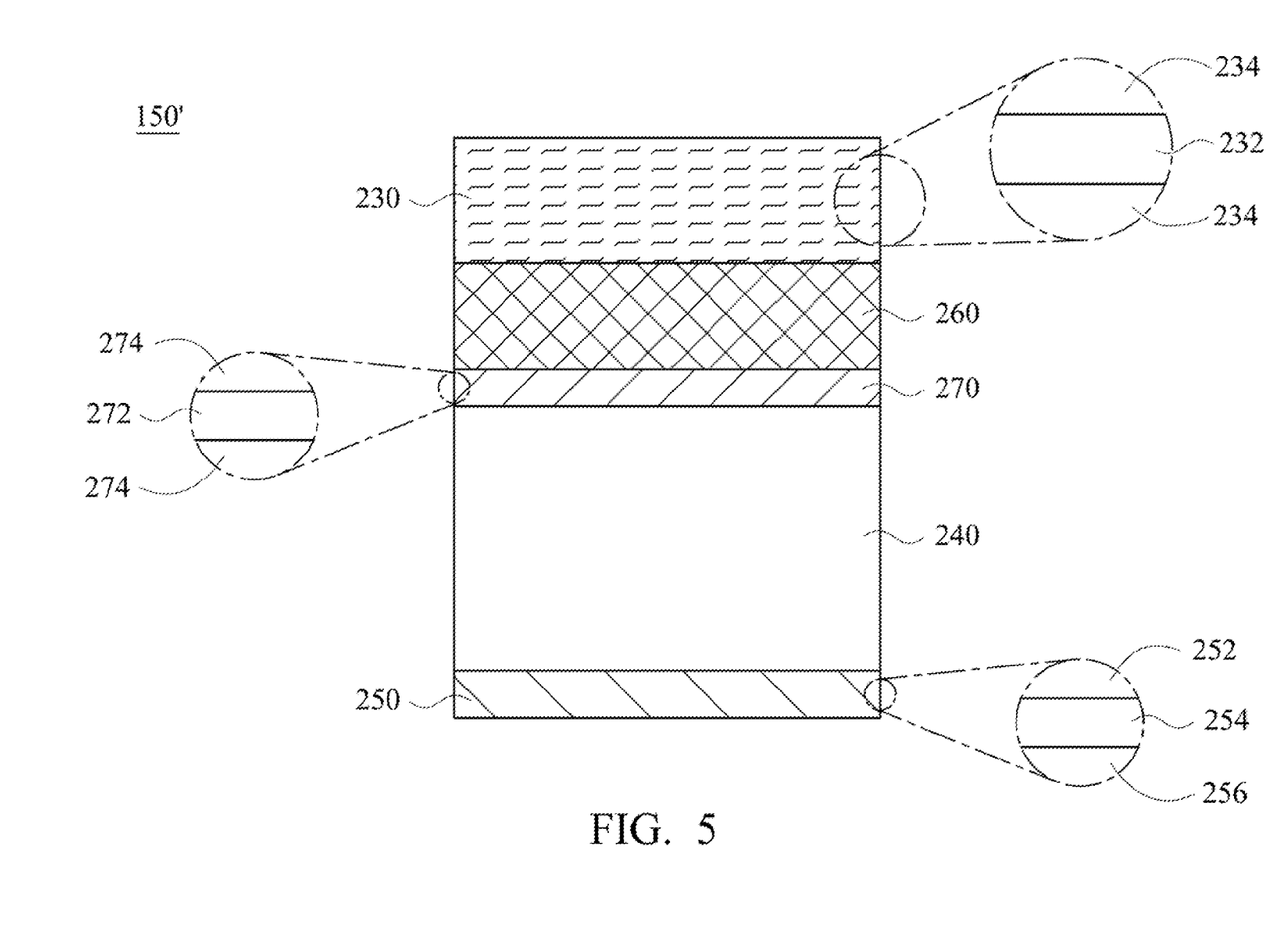
FIG. 5 is a schematic diagram of a composite adhesive layer according to another embodiment of the present invention.

FIG. 5 is a schematic diagram of a composite adhesive layer according to another embodiment of the present invention. Referring to FIG. 3 and FIG. 5, according to another embodiment of the present invention, in addition to the first adhesive layer 230, the buffer layer 240, and the second adhesive layer 250, the composite adhesive layer 150' further includes a fourth adhesive layer 260 and a fifth adhesive layer 270. The fourth adhesive layer 260 is disposed adhesively between the first adhesive layer 230 and the fifth adhesive layer 270. The fifth adhesive layer 270 is disposed adhesively between the fourth adhesive layer 260 and the buffer layer 240. In other words in the present embodiment, the order of the foregoing layers from the front cover 120 to the display panel 140 are the first adhesive layer 230, the fourth adhesive layer 260, the fifth adhesive layer 270, the buffer layer 240, and the second adhesive layer 250.

In some embodiments of the present invention, the first adhesive layer 230 is a PET double-sided adhesive layer including two PMMA layers 234 and a PET layer 232. The PET layer 232 is disposed between the PMMA layers 234. One of the PMMA layers 234 is adhered to the front cover 120 and the other one of the PMMA layers 234 is adhered to the fourth adhesive layer 260. In some embodiments of the present invention, the fourth adhesive layer 260 is a polycarbonate (PC) layer. The fourth adhesive layer 260 is a PC thin film that is opaque, environment-friendly, black, and flame resistant, and the properties of the fourth adhesive layer 260 are such that the fourth adhesive layer 260 complies with the Restriction of Hazardous Substances Directive (RoHS) and the strict requirements of the Underwriters Laboratories (UL). For this reason, the fourth adhesive layer 260 may be used extensively as insulating or shielding in power supplies, televisions, display devices, and printers. In some embodiments of the present invention, the fifth adhesive layer 270 is a tissue-base double-sided adhesive layer including a cotton paper layer 272 and two acrylic acid layers 274. The cotton paper layer 272 is disposed between the acrylic acid layers 274, and one of the acrylic acid layers 274 is adhered to the fourth adhesive layer 260 and the other one of the acrylic acid layers 274 is adhered to the buffer layer 240. The fifth adhesive layer 270 uses cotton paper as a substrate, and provides great stability when cut to an adhesive tape size and further provides excellent operability when used for laminating and manufacturing, such that the acrylic acid layers 274 are suitable for laminating various surfaces.

In some embodiments of the present invention, the buffer layer 240 is a foamy layer made of a polyurethane material. The foamy layer of the buffer layer 240 is made of an elastic material that can buffer the touch force F. Therefore, the touch control display device 100 is protected from delamination caused by the touch force F to thereby prolong the life span of the touch control display device 100. In some embodiments of the present invention, the second adhesive layer 250 is a PET double-sided adhesive layer including a glue layer 256, a PET layer 254, and an acrylic acid layer 252. The PET layer 254 is disposed between the glue layer 256 and the acrylic acid layer 252. The glue layer 256 is adhered to the display panel 140. The acrylic acid layer 252 is adhered to the buffer layer 240. The second adhesive layer 250 has a weak adhesive property, is able to maintain its adhesivity for a long time, and leaves no adhesive residue after removal. By adhering the second adhesive layer 250 on the display panel 140, the formation of a gap between the glue layer 256 and the display panel 140 can be avoided so that the effects of dustproofing and fog-proofing can be achieved.

During assembly of the touch control display device of the present invention, the assembly worker aligns the front cover with the frame of the back cover, and then adheres the front cover to the back cover. However, when the assembly worker performs the adhering operation improperly, the particular design of the composite adhesive layer in the present invention is such that the assembly worker is able to redo the adhering operation. After the assembly worker removes the front cover from the back cover, the front cover can be aligned with and adhered to the frame of the back cover again without any adhesive residue being left on the display panel. When the front cover is fixed on the display panel hermetically, because the composite adhesive layer surrounding the inner edge of the front cover can block the entrance of dust or moisture, dust or moisture in the accommodating space formed by the back cover can not reach an illumination side of the display panel. Therefore, the display panel maintains a high display quality and avoids malfunctioning. Moreover, when the user touches the display panel with his or her fingers, a touch force is applied to the display panel. The composite adhesive layer in the present invention can buffer the touch force caused by the user, so it can protect the touch control display device and prevent delamination caused by touch forces to thereby prolong the life span of the touch control display device. The composite adhesive layer in the present invention is made of a PET material having a great tensile property. For this reason, even if the assembly worker applies a tension to the composite adhesive layer during assembly, the composite adhesive layer will not be deformed.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch control display device, comprising:
a back cover comprising a frame and an accommodating space;
a front cover comprising an opening, wherein the front cover is aligned with and attached to the frame of the back cover;
a touch panel fixed at an outer edge of the front cover and aligned with the opening of the front cover;
a display panel disposed in the accommodating space of the back cover and aligned with the opening; and
a composite adhesive layer surrounding an inner edge of the front cover and aligned with an edge portion of the display panel to fix the front cover on the display panel hermetically, wherein the composite adhesive layer comprises a first adhesive layer, a buffer layer, a second adhesive layer, a fourth adhesive layer, and a fifth adhesive layer, the first adhesive layer is adhered to the front cover, the buffer layer is disposed between the first adhesive layer and the second adhesive layer, the buffer layer is made of an elastic buffering material, the second adhesive layer is adhered to the display panel, and the adhesive property of the first adhesive layer is stickier than that of the second adhesive layer, wherein the fourth adhesive layer is disposed adhesively between the first adhesive layer and the fifth adhesive layer, and the fifth adhesive layer is disposed adhesively between the fourth adhesive layer and the buffer layer.

2. The touch control display device of claim 1, wherein the first adhesive layer is a polyethylene terephthalate (PET) double-sided adhesive layer comprising two polymethylmethacrylate (PMMA) layers and a PET layer, the PET layer is disposed between the PMMA layers, one of the PMMA layers is adhered to the front cover, and the other one of the PMMA layers is adhered to the buffer layer.

3. The touch control display device of claim 1, wherein the buffer layer is a foamy layer made of a polyurethane material.

4. The touch control display device of claim 1, wherein the second adhesive layer is a polyethylene terephthalate (PET) double-sided adhesive layer comprising a glue layer, a PET layer, and an acrylic acid layer, the PET layer is disposed between the glue layer and the acrylic acid layer, the glue layer is adhered to the display panel, and the acrylic acid layer is adhered to the buffer layer.

5. The touch control display device of claim 1, wherein the first adhesive layer is a polyethylene terephthalate (PET) double-sided adhesive layer comprising two polymethylmethacrylate (PMMA) layers and a PET layer, the PET layer is disposed between the PMMA layers, one of the PMMA layers is adhered to the front cover, and the other one of the PMMA layers is adhered to the fourth adhesive layer.

6. The touch control display device of claim 1, wherein the fourth adhesive layer is a polycarbonate (PC) layer.

7. The touch control display device of claim 1, wherein the fifth adhesive layer is a tissue-base double-sided adhesive layer comprising a cotton paper layer and two acrylic acid layers, the cotton paper layer is disposed between the acrylic acid layers, one of the acrylic acid layers is adhered to the fourth adhesive layer, and the other one of the acrylic acid layers is adhered to the buffer layer.

8. The touch control display device of claim 1, wherein the buffer layer is a foamy layer made of a polyurethane material.

9. The touch control display device of claim 1, wherein the second adhesive layer is a polyethylene terephthalate (PET) double-sided adhesive layer comprising a glue layer, a PET layer, and an acrylic acid layer, the PET layer is disposed between the glue layer and the acrylic acid layer, the glue layer is adhered to the display panel, and the acrylic acid layer is adhered to the buffer layer.

* * * * *